Figure 1:
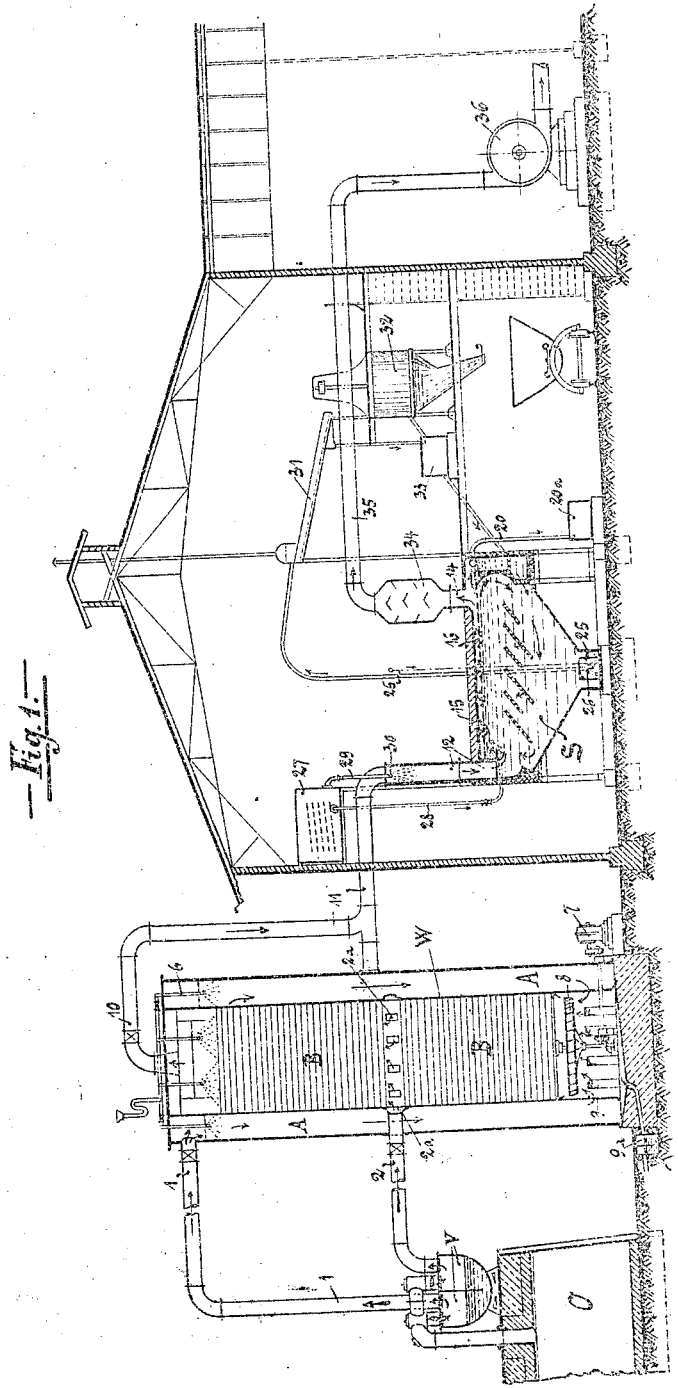

W. MUELLER.
METHOD OF DIRECT RECOVERY OF TAR AND AMMONIA FROM DISTILLATION GASES.
APPLICATION FILED APR. 18, 1911.

1,043,452.

Patented Nov. 5, 1912.
4 SHEETS—SHEET 1.

WITNESSES:
John C. Sanders
Arthur S. Peters

INVENTOR:
Wilhelm Mueller
BY
ATTY.

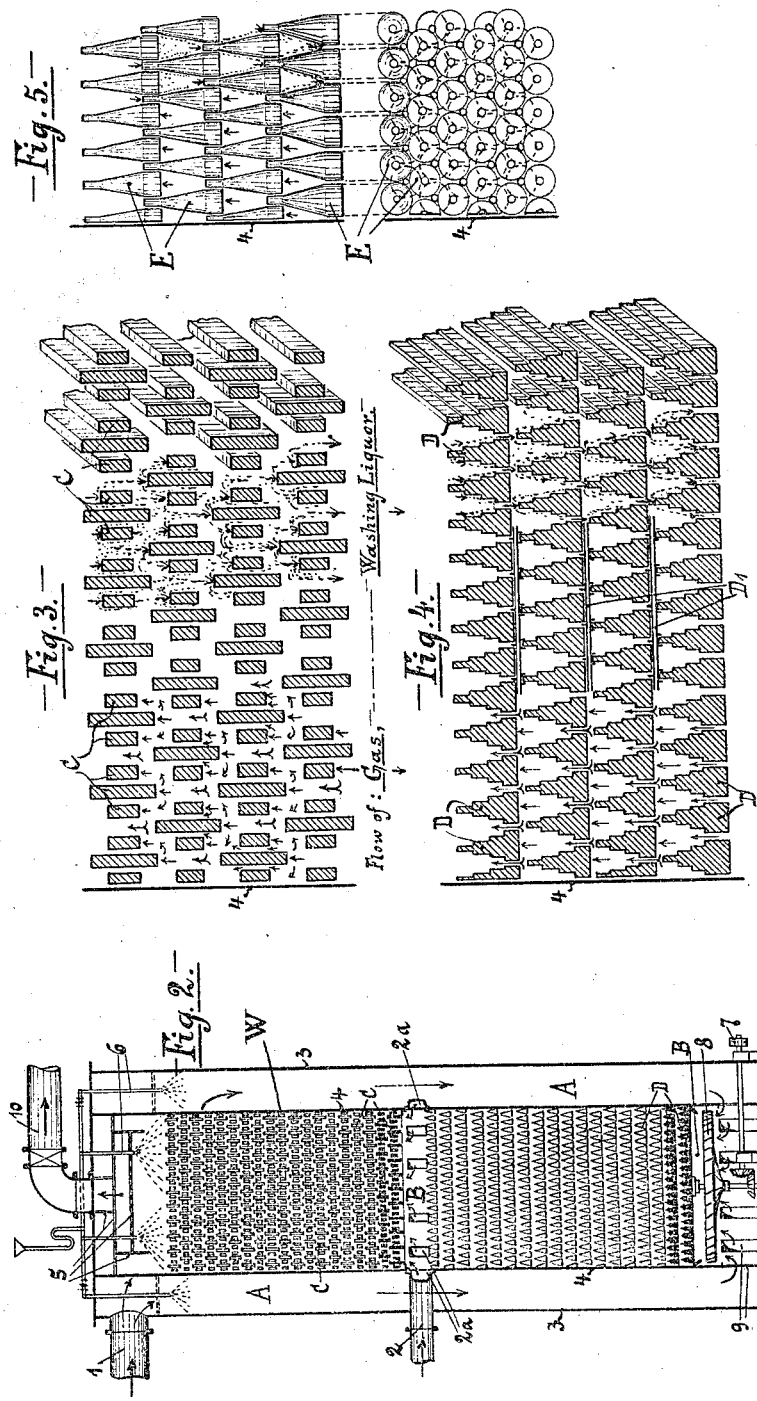

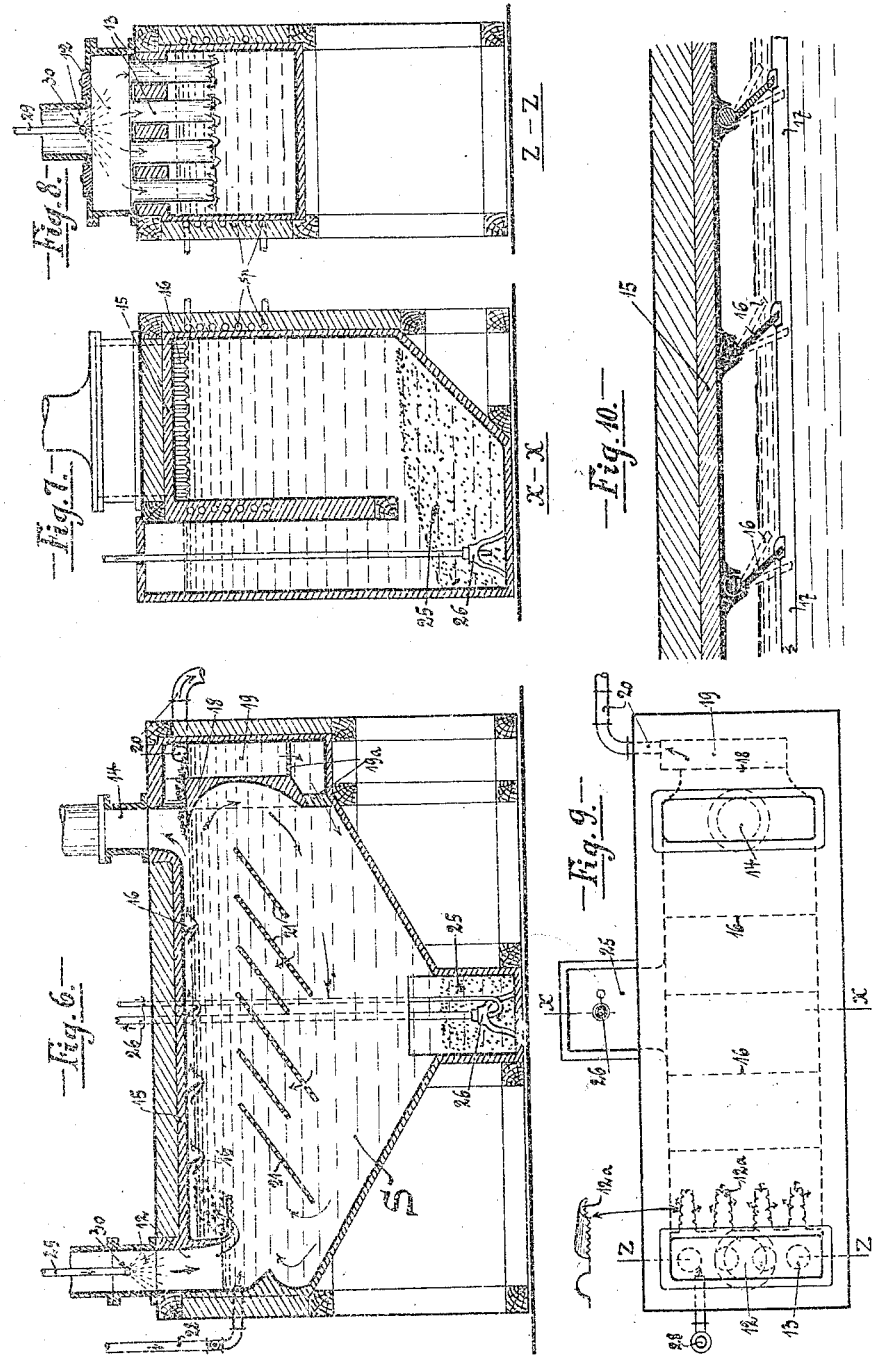

W. MUELLER.
METHOD OF DIRECT RECOVERY OF TAR AND AMMONIA FROM DISTILLATION GASES.
APPLICATION FILED APR. 18, 1911.
1,043,452.
Patented Nov. 5, 1912
4 SHEETS—SHEET 4.
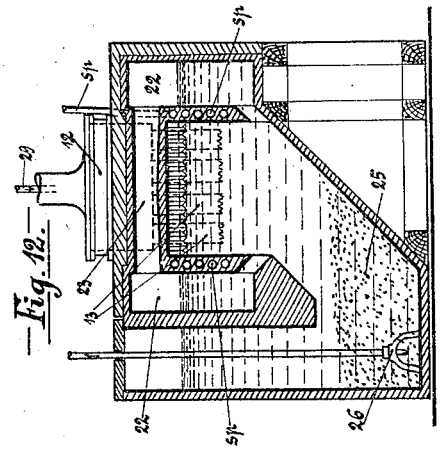
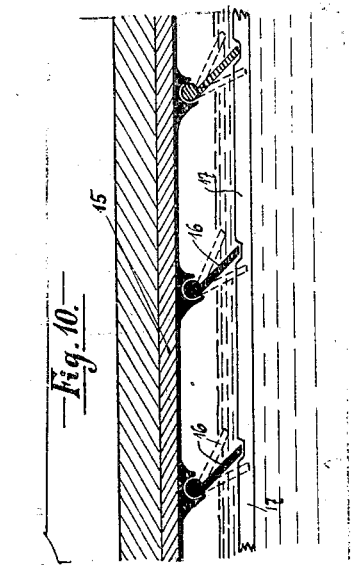
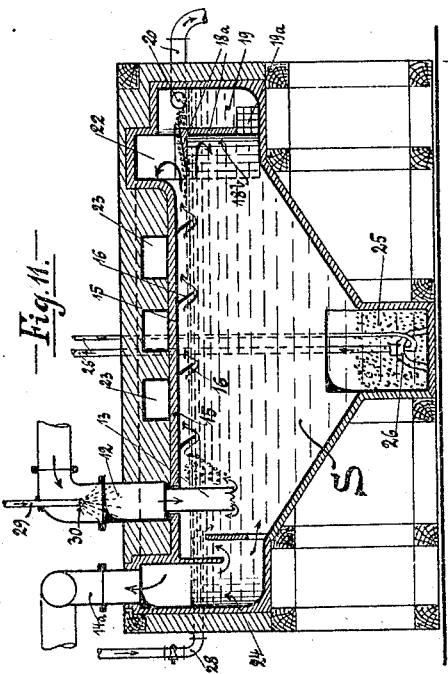
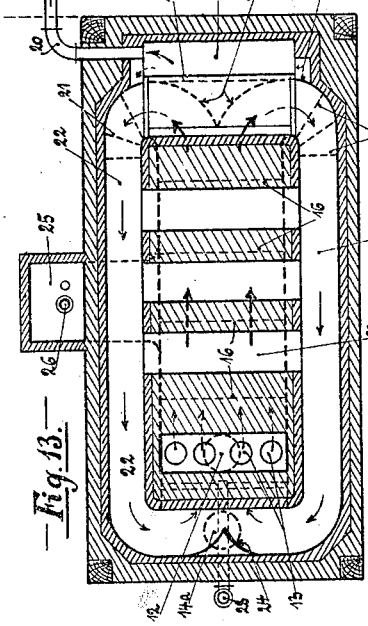
WITNESSES:
John C Sanders
Arthur S. Pettit
INVENTOR:
Wilhelm Mueller
BY
ATTY.

UNITED STATES PATENT OFFICE.

WILHELM MUELLER, OF ESSEN-ON-THE-RUHR, GERMANY.

METHOD OF DIRECT RECOVERY OF TAR AND AMMONIA FROM DISTILLATION-GASES.

1,043,452.  Specification of Letters Patent.  Patented Nov. 5, 1912.

Original application filed September 3, 1910, Serial No. 580,440. Divided and this application filed April 19, 1911. Serial No. 621,870.

*To all whom it may concern:*

Be it known that I, WILHELM MUELLER, a citizen of Germany, residing at 17 Gutenbergstrasse, Essen-on-the-Ruhr, Germany, have invented new and useful Improvements in Methods of Direct Recovery of Tar and Ammonia from Distillation-Gases, of which the following is a specification.

My present invention relates to a method or process of recovering successively oil, tar and ammonium sulfate from hot distillation gases of coal or other fuel, and has for its object to simplify the operations, to reduce to a minimum the power required for working, to produce perfectly pure tar and sulfate of ammonia in a direct manner without the use of steam or lime, and to reduce the initial outlay for the plant and the working and maintenance expenses. These improvements relating to a method represent a division from the improvements relating to the apparatus which form the subject of my co-pending application Serial No. 580,440, filed September 3rd, 1910.

The invention is, for example, illustrated in the accompanying drawings of which—

Figure 1 is a diagrammatic view of a suitable plant for treating the gases according to the improved method; Fig. 2 shows to a larger scale the apparatus marked A, B in Fig. 1 for cooling and washing the hot gases for the purpose of removing the tar, oil or benzol; Figs. 3, 4 and 5 illustrates various constructions of the grids or hurdles which may be used in the apparatus shown in Fig. 2; Fig. 6 shows in sectional elevation and to a larger scale the saturator marked S in Fig. 1 which is used for freeing the gases which have passed the washer shown in Fig. 2 from ammonia and recovering the latter in the form of sulfate; Figs. 7 and 8 are transverse sections on lines X—X and Z—Z respectively in Fig. 9; Fig. 9 is a plan of the apparatus shown in Fig. 6; Fig. 10 is a part section showing baffle-plates pivotally mounted on the flat top of the saturating-chamber; Fig. 11 illustrates a modified construction of the saturator; Fig. 12 is a vertical section and Fig. 13 a horizontal section through the apparatus shown in Fig. 11.

Like reference letters indicate like parts throughout the drawings.

The process of treating the gases in the apparatus is as follows:—In order to remove the by-products, more especially the tar and the ammonia, from coke-oven or distillation gases of coal or other fuel in a "direct" manner, it is essential first to separate the tar and other impurities from the hot gases, so that during the passage of the gases through the sulfuric acid bath in the saturator the ammoniacal-salts shall not be polluted by tarry substances and rendered unsalable. To attain this the hot gases which come direct from the ovens or retorts O and are somewhat cooled in the collecting mains V and the pipes, are introduced at a temperature of about 200 degrees centigrade into the apparatus W. The gases pass through the pipe 1 and enter the upper end of the outer chamber A and descend to the openings 9 through which they pass to the fan 8 which forces them up into the washer. During their passage through the outer chamber the gases cool down to a temperature of about 100 degrees C., the major part of the tar, dust and other impurities being condensed and separated from the gases. To prevent the formation of tar or dust deposits on the sides the latter may be sprinkled with for example gas water and thin tar from the top by means of the spray nozzles 6. The gases now pass upward through the washer B containing improved hurdles or grids C, D or E of the constructions shown in Figs. 3, 4 and 5. On passing over these hurdles the gas is repeatedly split up into numerous fine streams and is uniformly distributed throughout the whole space of the washer. Owing to the increased velocity imparted to the gases by the propeller or fan 8, and the fact that the gases strike many times against the horizontal surfaces of the grids or hurdles all solid and liquid substances are separated according to the principle of condensation by shock which is involved in the "Pelouze" apparatus. Since the hurdles are continuously sprayed from above and all surfaces are moistened by the liquor, the gases, in addition to the separating action due to the repeated impact, are brought into intimate contact with the washing-liquor and are therefore effectually purified. The purified gas passes through the screens 5 arranged in the top part of the washer, which screens retain even the slightest traces of water, and escapes in a dry, hot state say at a temperature of about 75° C. through the pipe 10 leading direct to the saturator S.

The products of condensation obtained by the cooling and washing of the gases, viz. dust, tar, oil and gas-water collect in the bottom part of the apparatus W from which they automatically run through a siphon pipe 9ª to a settling tank wherein separation according to specific gravity takes place. The recovered gas-water and, if required, also the light thin tar may advantageously by pumped to the top of the apparatus and used again as washing liquor, in which case they may be introduced through the spraying nozzles 6. The excess of gas-water which cannot be used for washing and contains only solid combinations of ammonia, is supplied without any further treatment to the acid bath of the saturator. The hot gases passing through the outer chamber A keep the inner chamber of the washer at a constant high temperature which may be regulated in such a manner that the gases leave the apparatus at a temperature of about 70–80 degrees C. at which temperature all the ammonia still remains volatile. For this reason, hot condensed gas-water or hot thin tar should be employed for spraying the hurdles so as to effect the washing of the gases without condensing the ammonia constitutents.

When distilling coal or other fuel which produces gases very rich in tar, it is preferred to collect the gases in two fractions corresponding to about the first three fourths and the last quarter of the period of distillation, separate mains being used for the two fractions. This manner of collecting the gases is not in itself new. While however it was hitherto usual to wash these two fractions separately, or not to wash the gas of the latter period at all, according to the present process both kinds of gas are washed simultaneously. For this purpose the gas obtained during the first three fourths of the distillation, which gas contains most of the tar and the impurities is introduced at the top through pipe 1 so that it has to pass through the whole of the apparatus in the manner already described. The gas produced during the last quarter of the distillation is then introduced through pipe 2 and duct 2ª in the middle of the apparatus where it mixes with the gases produced during the first three fourths of the distillation process already treated in the lower part of the washing apparatus, and is subjected therewith simultaneously to the washing action. As is well known the gases of the last period are much hotter than the gases rich in tar produced during the first period, and often cause incrassation of the tar in the apparatus, if the gases of both periods are treated simultaneously. This drawback is however, obviated if the gases enter the apparatus separately and are mixed only after the gases of the first period are more than half washed. By introducing the hot gases of the second period only into the upper portion of the washer the further advantage is attained that the hot gas-water (or thin tar) used as washing liquor is still further heated whereby the ammonia constituents contained in the gas-water are vaporized and caused to escape together with the gas. The hot gas still charged with all the ammonia combinations is passed from the washer W through pipes 10 and 11 directly into the sulfuric acid bath of the saturator S, see Fig. 6 or Fig. 11. It enters the bath through the widened end of pipe 12 with its distribution hoods 12ª or through a number of smaller pipes 13, bubbles up through the bath to the top 15 of the saturator, and then moves in a thin and wide stream over the surface of the bath to the exit. Since the ammonia is not completely absorbed during the first passage through the acid, the gas is compelled to pass repeatedly through the acid by the baffle-plates 16 which dip into the bath and are inclined in the direction of the gas current. The result of this arrangement is that on the one hand all the ammonia contained in the gas is completely absorbed and on the other hand the upper zone of the bath is given a continuous forward movement. On account of the latter all the impurities collecting on the surface, such as tar-froth or the like, are carried toward the end of the bath and caused to pass over the wall 18 into the froth-chamber 19 from which they run outward into a tank or cask 20ª through a pipe 20.

The liquor carried together with the froth into the chamber 19 returns to the bath through the screens 19ª at the bottom. In this way the surface of the bath is always kept in a clean condition. The concave inner surface 18ª of the wall 18 of the chamber 19 deflects the stream of liquor, either in the downward direction as in Fig. 6, or in the lateral directions as in Figs. 11, 12 and 13 (by means of surfaces 18ᵇ and 24). Owing to this circulation the upper zone of the acid bath is thoroughly stirred and the efficiency is increased while the consumption of the acid is reduced to a minimum. For the same purpose and in order to prevent condensation of the aqueous vapors contained in the gas, the saturating-chamber is heated at the sides by means of the steam pipe coil *sp* and the additional sulfuric acid or other liquor is supplied to the saturator at a high temperature through pipe (28 or 29) whereby the reaction heat is increased. By the introduction of hot sulfuric acid from the reservoir 27 through pipe 29 and nozzle 30 direct into the gas inlet pipe 12 of the saturator a more intimate intermingling with the gas and a quicker absorption of the ammonia is attained.

The plates 21 arranged according to Fig. 6 in the middle zone of the saturator retain the solid salts of ammonia carried forward by the circulation of the bath and cause the salts to settle. These perforated plates 21 are arranged in the construction according to Figs. 11 and 13 near the entrance and in the lateral passages 22.

The crystallizing solid salt of ammonia produced in the saturator by the reaction of the ammonia upon the sulfuric acid drops into the lower collecting chamber 25 and is lifted in a well known manner by means of a steam ejector 26 to a draining table 31 from which latter it is delivered to the centrifugal drying machine 32 which leaves the salt in a salable condition and ready to be stored. The separated lye or liquor runs into a liquor-pot 33 which automatically returns the liquor to the bath in the saturator for further treatment. The gases which are entirely purified from tar and ammonia are finally drawn from the saturator through an acid separator 34 and pipe 35 by means of an exhauster 36 which forces them into a gasometer in which they are stored to be used for illuminating, heating or motive-power purposes.

The new method of producing the ammonia in a "direct" manner without the aid of steam or lime enable the recovery of the by-products to be effected in a much more economical way than hitherto, and has the further advantage that the employment of the usual arrangement for washing and distilling with their inevitable poisonous effluent liquor and mud nuisance is entirely dispensed with.

I claim:

1. Process of direct production of tar and ammonium-sulfate from distillation gases of coal or other fuel consisting in collecting the gases in two fractions, one fraction being collected during about the first three fourths and the other during the last quarter of the distillation period, introducing the first fraction into the washer in such a manner as to cause the said first fraction to pass through the whole space of a cooling and washing apparatus and introducing the second fraction into the center of the inner washing chamber so as to mix with the half washed gases of the first fraction, both fractions being then simultaneously washed and treated together as described in the upper portion of the washing chamber.

2. Process of direct recovery of tar and ammonium-sulfate from distillation gases of coal or other fuel consisting in cooling the hot gases coming direct from the ovens or retorts to about 70 to 80 degrees C., washing the gases by means of the previously condensed hot liquor, splitting the volume of gases during washing into a number of fine streams, passing the gases at the aforesaid temperature immediately after washing into and through the sulfuric acid bath of a saturator in which the ammonia is recovered in the form of sulfate and supplying to the bath additional sulfuric acid at a high temperature.

3. Process of direct production of tar and ammonium sulfate from distillation gases of coal or other fuel coming directly from the ovens or retorts, consisting in cooling the hot gases to about 70 to 80 degrees C., simultaneously washing the gases in a washing chamber on the counter current principle by means of the previously condensed hot gas liquor meanwhile splitting the volume of gas to be washed into a number of fine streams and causing the latter to perform a tortuous course and to have repeated impact with surfaces obstructing their path whereby all tar and oily substances are mechanically separated, and passing the gases at the aforesaid temperature immediately after washing through the sulfuric acid bath of a saturator wherein the ammonia is recovered in the form of sulfate, supplying the sulfuric acid to the saturator at a high temperature and supplying additional sulfuric acid at a high temperature into the gas inlet pipe of the saturator.

In testimony whereof I have signed my name to this specification in the presence of two subscribing witnesses.

WILHELM MUELLER. [L. S.]

Witnesses:
ALFRED HENKEL,
MAX GREGORIC.